(12) United States Patent
Ohyama

(10) Patent No.: US 9,025,093 B2
(45) Date of Patent: May 5, 2015

(54) LIQUID CRYSTAL DISPLAY DEVICE, ELECTRONIC APPARATUS, AND OPTICAL DEVICE

(71) Applicant: Japan Display West, Inc., Aichi-Ken (JP)

(72) Inventor: Tsuyoshi Ohyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 99 days.

(21) Appl. No.: 13/682,853

(22) Filed: Nov. 21, 2012

(65) Prior Publication Data

US 2013/0148043 A1    Jun. 13, 2013

(30) Foreign Application Priority Data

Dec. 13, 2011    (JP) .................. 2011-271943

(51) Int. Cl.
*G02F 1/1335*    (2006.01)
*G02F 1/13*    (2006.01)
*G02F 1/1347*    (2006.01)
*G02F 1/1333*    (2006.01)

(52) U.S. Cl.
CPC ........ *G02F 1/1313* (2013.01); *G02F 1/133371* (2013.01); *G02F 1/133526* (2013.01); *G02F 1/13471* (2013.01); *G02F 2203/62* (2013.01)

(58) Field of Classification Search
CPC .. G02B 27/2214; G02B 27/22; G02B 27/225; G02B 27/2207; G02B 5/201; H04N 13/0404; H04N 13/0409; H04N 13/0239; H04N 13/0402; H04N 13/0456; H04N 13/0415; H04N 13/0018; H04N 13/0452; H04N 13/00; H04N 13/0447; H04N 13/0029; H04N 13/0413; H04N 13/004; H04N 13/0285; H04N 13/0007; H04N 13/0282; H04N 13/0445; H04N 13/0477; H04N 13/0011; H04N 13/0059; H04N 13/0225; H04N 13/0232; H04N 13/0292; H04N 13/0411; H04N 21/816; G03B 35/18; G09G 3/003; G09G 3/36; G09G 3/3611; G09G 3/3648; G09G 3/00; G09G 2300/0439; G09G 2300/0469; G02F 1/133526; G02F 1/1335; G02F 1/1343; G02F 1/29; G02F 1/134309; G02F 1/13; G02F 1/133; G02F 1/1337; G02F 1/13306; G02F 1/1362; G02F 1/1313; G02F 1/1323; G02F 1/134336; G02F 1/133784; G02F 1/133707; C09K 19/02
USPC ............ 349/15, 139, 200, 33, 123, 179, 130, 349/126, 178, 129; 345/419, 204, 87, 104, 345/214; 348/51, E13.026, E13.044, 42; 359/463, 462
See application file for complete search history.

(56) References Cited

U.S. PATENT DOCUMENTS

| 7,733,452 | B2 * | 6/2010 | Chen et al. ................ 349/135 |
| 7,911,548 | B2 * | 3/2011 | Hong et al. ................ 349/15 |
| 1,017,590 | A1 | 7/2011 | Zheng et al. |
| 8,045,133 | B2 * | 10/2011 | Shin et al. ................ 349/200 |
| 8,223,279 | B2 * | 7/2012 | Zheng et al. ................ 349/15 |
| 8,305,551 | B2 * | 11/2012 | Son ................ 349/200 |
| 2006/0250557 | A1 | 11/2006 | Chen et al. |
| 2009/0015739 | A1 | 1/2009 | Shin et al. |
| 2011/0128456 | A1 | 6/2011 | Son |

FOREIGN PATENT DOCUMENTS

| JP | 07-072445 | 3/1995 |
| JP | 2006-276569 A | 10/2006 |
| JP | 2007-226231 A | 9/2007 |
| JP | 2009-520231 A | 5/2009 |
| JP | 2010-170068 | 8/2010 |

OTHER PUBLICATIONS

Taiwanese Office Action mailed issued Jun. 6, 2014 for corresponding Taiwanese Application No. 101137821.
Japanese Office Action issued May 13, 2014 for corresponding Japanese Application No. 2011-271943.

\* cited by examiner

Primary Examiner — Thoi Duong
(74) Attorney, Agent, or Firm — Rader, Fishman & Grauer PLLC

(57) ABSTRACT

A liquid crystal display device includes a liquid crystal panel which displays a left eye image and a right eye image; and an optical device which generates a lens effect of a lens group which causes binocular parallax, wherein the optical device includes a first substrate and a second substrate which are disposed opposed to each other with an interval therebetween, a first electrode which is formed on the first substrate so as to be opposed to the second substrate, a second electrode which is formed on the second substrate so as to be opposed to the first substrate, and a liquid crystal layer which is disposed between the first substrate and the second substrate and includes liquid crystal molecules, the alignment direction of which is changed in accordance with a voltage which is applied to the first electrode and the second electrode.

14 Claims, 14 Drawing Sheets

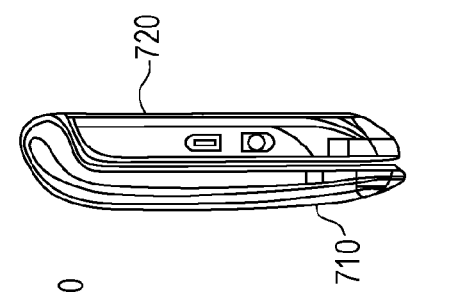
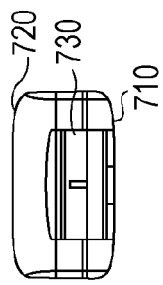
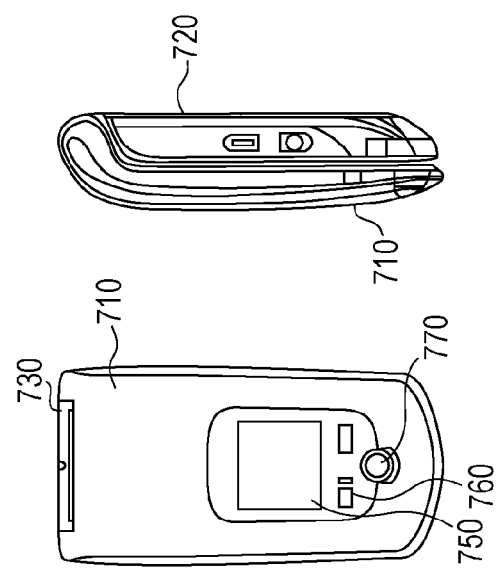
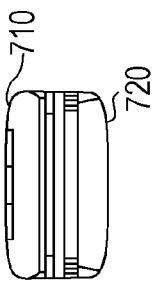
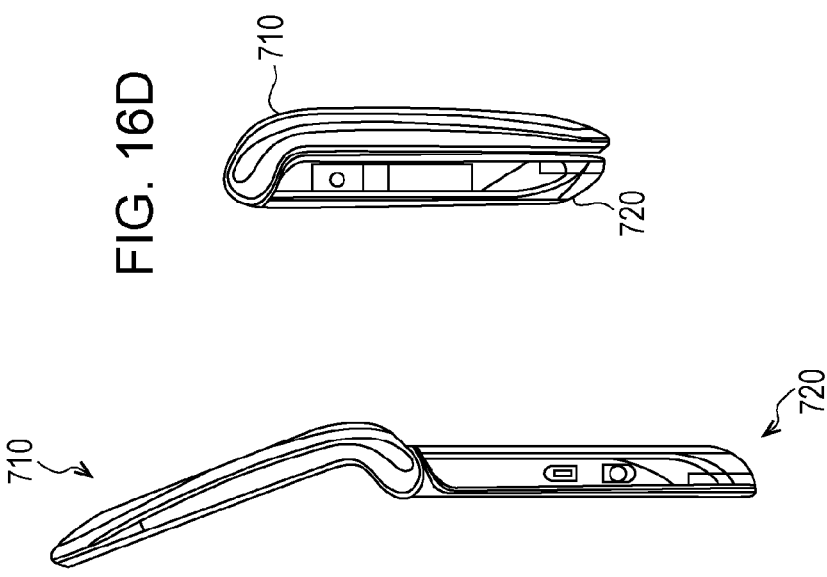
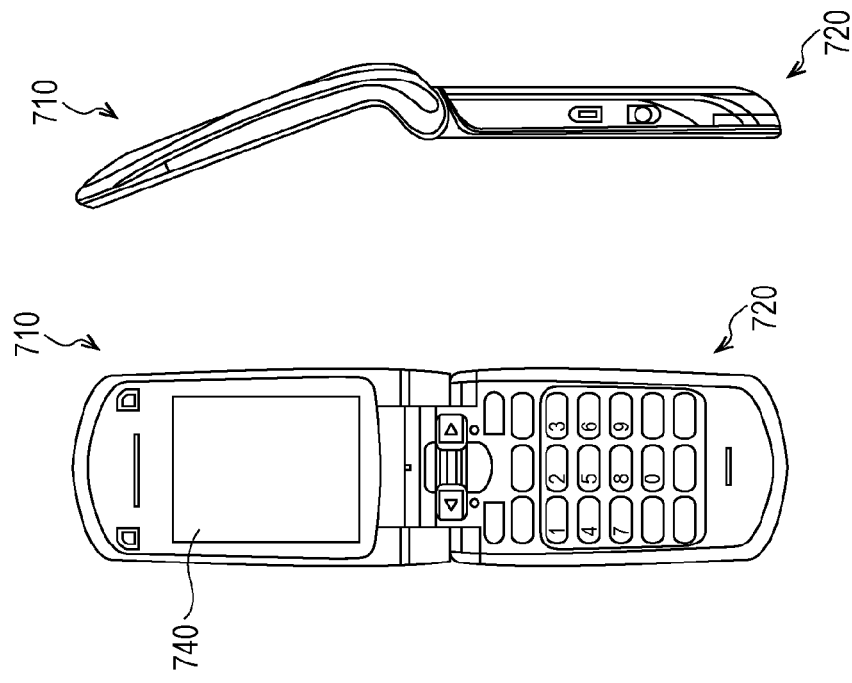

# LIQUID CRYSTAL DISPLAY DEVICE, ELECTRONIC APPARATUS, AND OPTICAL DEVICE

BACKGROUND

The present disclosure relates to a liquid crystal display device, an electronic apparatus, and an optical device, and particularly to a liquid crystal display device, an electronic apparatus, and an optical device which are adapted to improve productivity and stabilize optical characteristics of a liquid crystal lens.

Hitherto, display devices have been known which display a 3D image through a parallax barrier method, a lenticular lens method, or the like without necessary for a pair of special spectacles.

Among the display devices, there are display devices which use a liquid crystal lens as a lenticular lens to display a 3D image (for example, see Japanese Unexamined Patent Application Publication Nos. 7-72445 and 2010-170068)

In the liquid crystal lens which is used in the above-described display devices, the arrangement direction of liquid crystal molecules is changed in accordance with a voltage which is applied to the electrode, and thus the liquid crystal lens has the same optical characteristics as a lenticular lens.

Generally, in such a liquid crystal lens, the initial alignment of the liquid crystal molecules, that is, the alignment of the liquid crystal molecules in a state in which no voltage is applied to the electrode is parallel to the display surface.

SUMMARY

However, in the liquid crystal lens, it is necessary to subject the alignment film to a rubbing process in order to make the initial alignment of the liquid crystal molecules parallel to the display surface.

The rubbing process for the alignment film has elements that prevent an improvement in productivity, such as dust emission or contamination of the surface of the alignment film due to the rubbing process and alignment controllability.

In addition, when there is a variation in the direction of rubbing by the rubbing process, there is also a variation in the pre-tilt angle of the liquid crystal molecules, and thus a domain is generated in the liquid crystal lens and there is concern that optical characteristics of the liquid crystal lens deteriorate.

It is desirable to improve productivity and stabilize optical characteristics of a liquid crystal lens.

According to an embodiment of the present disclosure, there is provided a liquid crystal display device including a liquid crystal panel which displays a left eye image and a right eye image; and an optical device which generates a lens effect of a lens group which causes binocular parallax, in which the optical device includes a first substrate and a second substrate which are disposed opposed to each other with an interval therebetween, a first electrode which is formed on the first substrate so as to be opposed to the second substrate and has a plurality of transparent electrodes extending in a predetermined direction and arranged with intervals therebetween in a width direction, a second electrode which is formed on the second substrate so as to be opposed to the first substrate, and a liquid crystal layer which is disposed between the first substrate and the second substrate and includes liquid crystal molecules, the alignment direction of which is changed in accordance with a voltage which is applied to the first electrode and the second electrode, and in the liquid crystal layer, the liquid crystal molecules are aligned vertically in a state in which no voltage is applied to the first electrode and the second electrode.

In the plurality of transparent electrodes corresponding to one lens of the lens group, the transparent electrode positioned at the center in the width direction may be provided with a slit or a protrusion in the predetermined direction.

In the plurality of transparent electrodes corresponding to one lens, the highest voltage may be applied to the transparent electrode positioned at the center in the width direction, and the applied voltage may be lower the further the transparent electrode is positioned toward the outer side in the width direction.

The second electrode may have a plurality of transparent electrodes extending in a direction perpendicular to the predetermined direction and arranged with intervals therebetween in a width direction, and the voltage which is applied to the first electrode and the second electrode may be switched in accordance with a display state of the image displayed on the liquid crystal panel.

The liquid crystal molecules may constitute a nematic liquid crystal having negative dielectric anisotropy.

According to another embodiment of the present disclosure, there is provided an electronic apparatus including a liquid crystal display device which performs display on the basis of an image signal; and a processor which generates the image signal through a predetermined process, in which the liquid crystal display device includes a liquid crystal panel which displays a left eye image and a right eye image, and an optical device which generates a lens effect of a lens group which causes binocular parallax, the optical device includes a first substrate and a second substrate which are disposed opposed to each other with an interval therebetween, a first electrode which is formed on the first substrate so as to be opposed to the second substrate and has a plurality of transparent electrodes extending in a predetermined direction and arranged with intervals therebetween in a width direction, a second electrode which is formed on the second substrate so as to be opposed to the first substrate, and a liquid crystal layer which is disposed between the first substrate and the second substrate and includes liquid crystal molecules, the alignment direction of which is changed in accordance with a voltage which is applied to the first electrode and the second electrode, and in the liquid crystal layer, the liquid crystal molecules are aligned vertically in a state in which no voltage is applied to the first electrode and the second electrode.

According to still another embodiment of the present disclosure, there is provided an optical device including a first substrate and a second substrate which are disposed opposed to each other with an interval therebetween; a first electrode which is formed on the first substrate so as to be opposed to the second substrate and has a plurality of transparent electrodes extending in a predetermined direction and arranged with intervals therebetween in a width direction; a second electrode which is formed on the second substrate so as to be opposed to the first substrate; and a liquid crystal layer which is disposed between the first substrate and the second substrate and includes liquid crystal molecules, the alignment direction of which is changed in accordance with a voltage which is applied to the first electrode and the second electrode, in which in the liquid crystal layer, the liquid crystal molecules are aligned vertically in a state in which no voltage is applied to the first electrode and the second electrode.

According to the embodiments of the present disclosure, in the liquid crystal layer, the liquid crystal molecules are aligned vertically in a state in which no voltage is applied to the first electrode and the second electrode.

According to the embodiments of the present disclosure, it is possible to improve productivity and stabilize optical characteristics of a liquid crystal lens.

BRIEF DESCRIPTION OF THE DRAWINGS

FIGS. 16A to 16G are diagrams illustrating an example of the application to an electronic apparatus of the present disclosure.

DETAILED DESCRIPTION OF EMBODIMENTS

Figure 1:
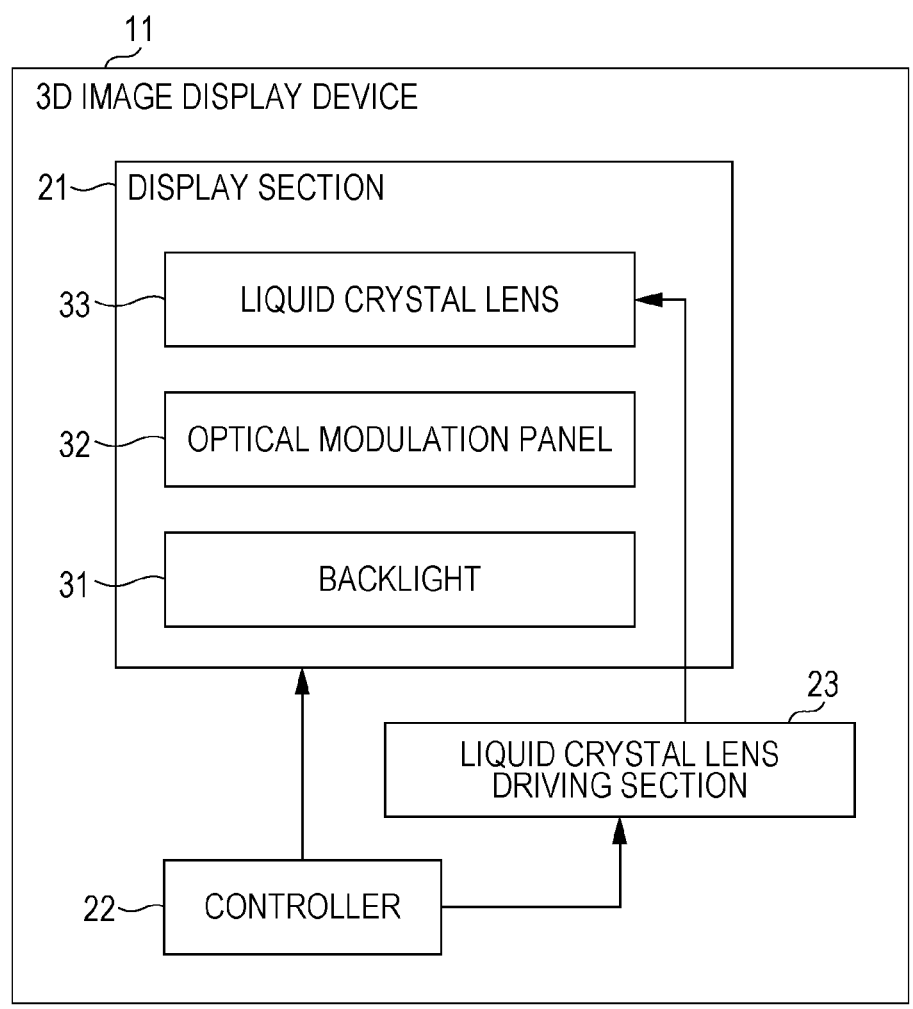
FIG. 1 is a diagram showing an example of the configuration of an embodiment of a 3D image display device to which the present disclosure is applied.

Hereinafter, embodiments of the present disclosure will be described with reference to the drawings. The description will proceed in the following order.
1. First Embodiment
2. Second Embodiment
3. Third Embodiment
4. Fourth Embodiment
5. Examples of Application to Electronic Apparatus
1. First Embodiment
Examples of Configuration of 3D Image Display Device FIG. 1 is a diagram showing an example of the configuration of an embodiment of a 3D image display device to which the present disclosure is applied.

A 3D image display device 11 displays a 3D image and a 2D image while performing switching between the display of a three-dimensional image through a lenticular lens method and the display of a two-dimensional image as necessary. The 3D image display device 11 has a display section 21, a controller 22, and a liquid crystal lens driving section 23.

The display section 21 is formed of a backlight 31, an optical modulation panel 32, and a liquid crystal lens 33, and displays a three-dimensional image formed of a right eye image which is observed (perceived) by the right eye of an observer and a left eye image which is observed by the left eye of the observer, and a two-dimensional image.

That is, the backlight 31 is a dedicated lighting device for image display which is formed of a light guide plate, a light source such as a Light Emitting Diode (LED), a reflecting sheet, and the like, and emits light rays for displaying an image to make the light rays incident on the optical modulation panel 32.

The optical modulation panel 32 is a liquid crystal display panel formed of color filters for R, G, and B colors, a liquid crystal layer, a polarizing plate, a thin-film transistor, and the like, and transmits light rays incident from the backlight 31 to display a right eye image and a left eye image. At this time, the optical modulation panel 32 changes the optical transmittance for each pixel provided in the optical modulation panel 32 to perform gradation display of the pixels of the image.

The liquid crystal lens 33 is formed of two substrates which are disposed opposed to each other with an interval therebetween and a liquid crystal layer which is disposed between the two substrates. In the liquid crystal lens 33, by virtue of the liquid crystal lens driving section 23, the liquid crystal layer has the same optical characteristics (lens effect) as a lenticular lens which is formed of a plurality of cylindrical lenses to cause binocular parallax. That is, the liquid crystal lens 33 functions as an optical device.

The controller 22 controls the sections in the 3D image display device 11, that is, the display section 21 and the liquid crystal lens driving section 23. For example, the controller 22 drives a display driver (not shown) of the display section 21 to display an image on the optical modulation panel 32 or to emit light rays from the backlight 31.

The liquid crystal lens driving section 23 drives the liquid crystal lens 33 in accordance with the control of the controller 22 to change the alignment direction of liquid crystal molecules included in the liquid crystal layer, whereby the liquid crystal layer has the same lens effect as a lenticular lens formed of a plurality of cylindrical lenses.

Examples of Configuration of Display Section

Next, examples of the configuration of the display section 21 of FIG. 1 will be described in detail with reference to FIG. 2. In the display section 21 of FIG. 2, parts corresponding to the parts in the display section 21 of FIG. 1 will be denoted by the same reference symbols, and descriptions thereof will be appropriately omitted. In addition, in FIG. 2, the transverse direction, the depth direction, and the longitudinal direction are set as an x direction, a y direction, and a z direction, respectively.

Figure 2:
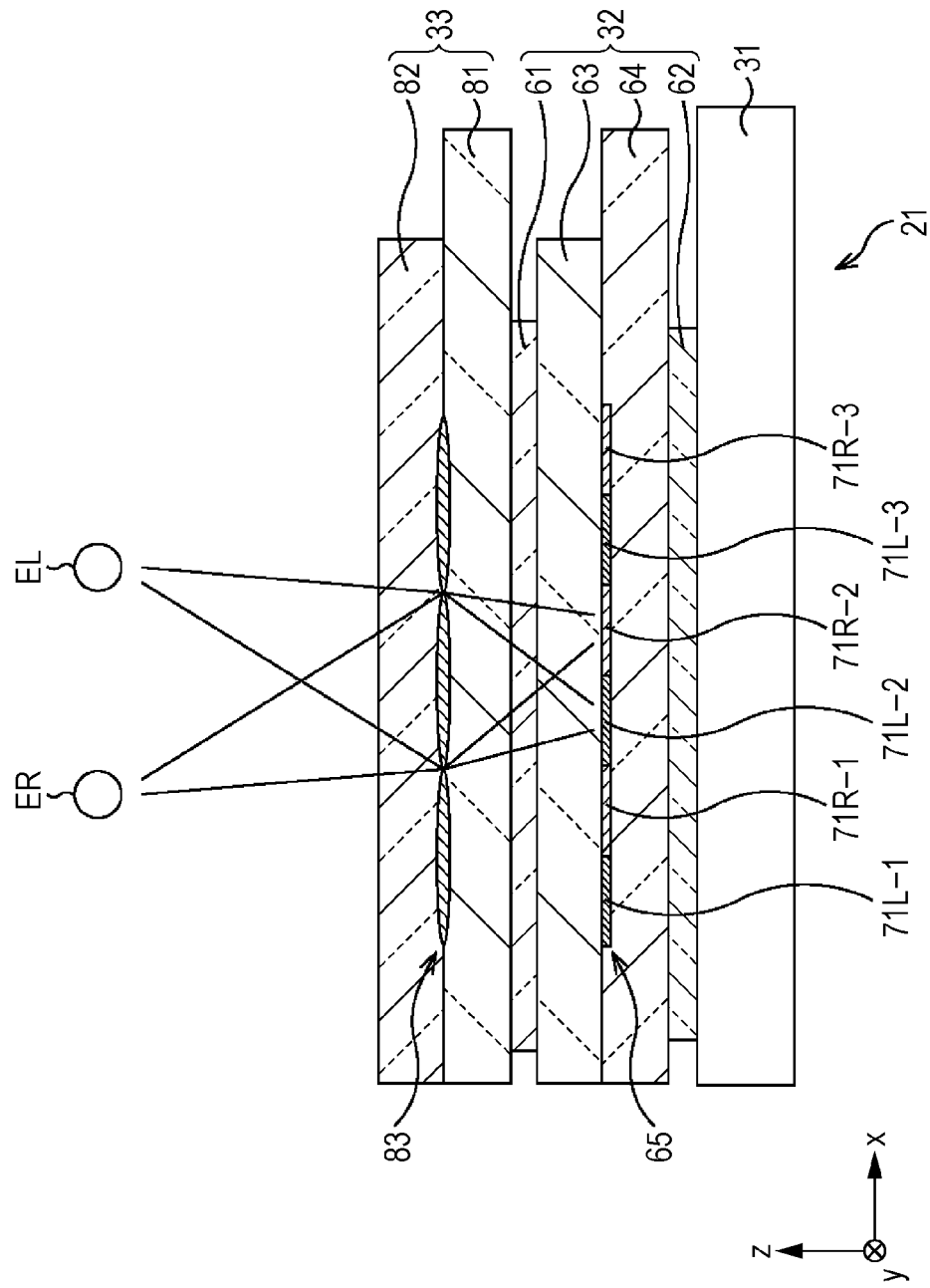
FIG. 2 is a diagram showing an example of the configuration of a display section.

In FIG. 2, the optical modulation panel 32 has a polarizing plate 61, a polarizing plate 62, an opposing substrate 63, a Thin Film Transistor (TFT) substrate 64, and a liquid crystal layer 65.

That is, the planar opposing substrate 63 and the planar TFT substrate 64 are provided opposed to each other between the polarizing plate 61 and the polarizing plate 62 which are disposed opposed to each other. In addition, the liquid crystal layer 65 is formed between the opposing substrate 63 and the TFT substrate 64.

A color filter and an opposing electrode are provided for each pixel on the surface of the opposing substrate 63 on the side of the liquid crystal layer 65. Specifically, color filters for R, G, and B colors are provided in areas of the pixels of the opposing substrate 63. In addition, a pixel electrode and a Thin Film Transistor (TFT) as a driving element are provided for each pixel on the surface of the TFT substrate 64 on the side of the liquid crystal layer 65.

The liquid crystal layer 65 is provided with transmitting sections 71L-1 to 71L-3 transmitting light rays for displaying a left eye image in the display of a 3D image, and transmitting sections 71R-1 to 71R-3 transmitting light rays for displaying a right eye image in the display of a 3D image. In the optical modulation panel 32, one transmitting section is provided for each of the pixels arranged in a matrix.

In the display of a 3D image or a 2D image, when a voltage is applied to the opposing electrode of the opposing substrate 63 and the pixel electrode of the TFT substrate 64 by control of the controller 22, the alignment direction of liquid crystal molecules enclosed in the transmitting sections 71L-1 to transmitting sections 71R-3 is changed in accordance with the magnitude of the voltage. Accordingly, the transmittance of the light rays incident on the optical modulation panel 32 from the backlight 31 is changed, and the intensities of the light rays passing through the respective pixels are light intensities corresponding to the pixel values of the pixels of images which are displayed on the pixels.

Hereinafter, when it is not necessary to distinguish the transmitting sections 71L-1 to 71L-3 individually, these will be simply referred to as the transmitting sections 71L, and when it is not necessary to distinguish the transmitting sections 71R-1 to 71R-3 individually, these will be simply referred to as the transmitting sections 71R. In addition, when it is not particularly necessary to distinguish the transmitting sections 71L and the transmitting sections 71R, these will also be simply referred to as the transmitting sections 71.

In the optical modulation panel 32, the transmitting sections 71L and the transmitting sections 71R are alternately provided in the x direction on the x-y plane. Either the transmitting sections 71L or the transmitting sections 71R are continuously arranged in the y direction.

Accordingly, in the display of a 3D image, rectangular areas for a left eye image which constitutes the 3D image and rectangular areas for a right eye image which constitutes the 3D image are alternately arranged and displayed in the x direction on the optical modulation panel 32. In addition, light rays passing through one pixel, that is, one transmitting section 71 are light rays displaying one pixel on the image.

Here, the left eye image and the right eye image which constitute the 3D image are images having parallax therebetween. The x direction in FIG. 2 is a direction of the parallax between the left eye image and the right eye image (parallax direction), that is, a direction in which right and left eyes ER and EL of an observer are arranged.

In addition, in the display of a two-dimensional image, the respective transmitting sections 71 transmit light rays for displaying a 2D image which are incident from the backlight 31, and make the light rays incident on the eyes of the observer.

The liquid crystal lens 33 has a first substrate 81, a second substrate 82, and a liquid crystal layer 83.

The planar first substrate 81 and the planar second substrate 82 are transparent substrates made of, for example, a glass material or a resin material. The first substrate 81 and the second substrate 82 are provided opposed to each other, and the liquid crystal layer 83 is formed between the first substrate 81 and the second substrate 82.

An electrode and an alignment film are provided for each area corresponding to one pixel of the left eye image and one pixel of the right eye image of the optical modulation panel 32 on the surface of the first substrate 81 on the side of the liquid crystal layer 83. In addition, an electrode and an alignment film are also provided for each area as described above on the surface of the second substrate 82 on the side of the liquid crystal layer 83.

Structure of Liquid Crystal Lens

Figure 3:
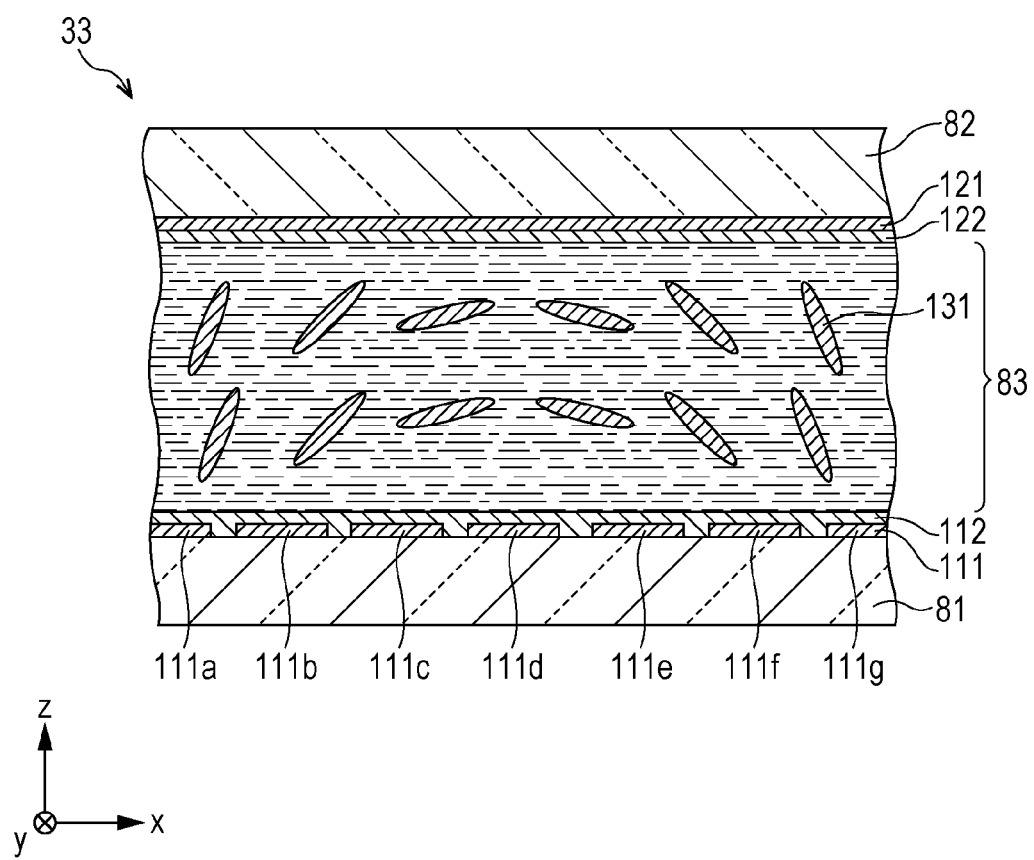
FIG. 3 is a cross-sectional view illustrating the structure of a liquid crystal lens.

Here, the structure of the liquid crystal lens 33 of FIG. 2 will be described in detail with reference to FIG. 3. FIG. 3 shows a cross-sectional view of an area corresponding to each pixel of the optical modulation panel 32 in the liquid crystal lens 33. In the liquid crystal lens 33 of FIG. 3, parts corresponding to the parts in the liquid crystal lens 33 of FIG. 2 will be denoted by the same reference symbols, and descriptions thereof will be appropriately omitted.

Figure 4:
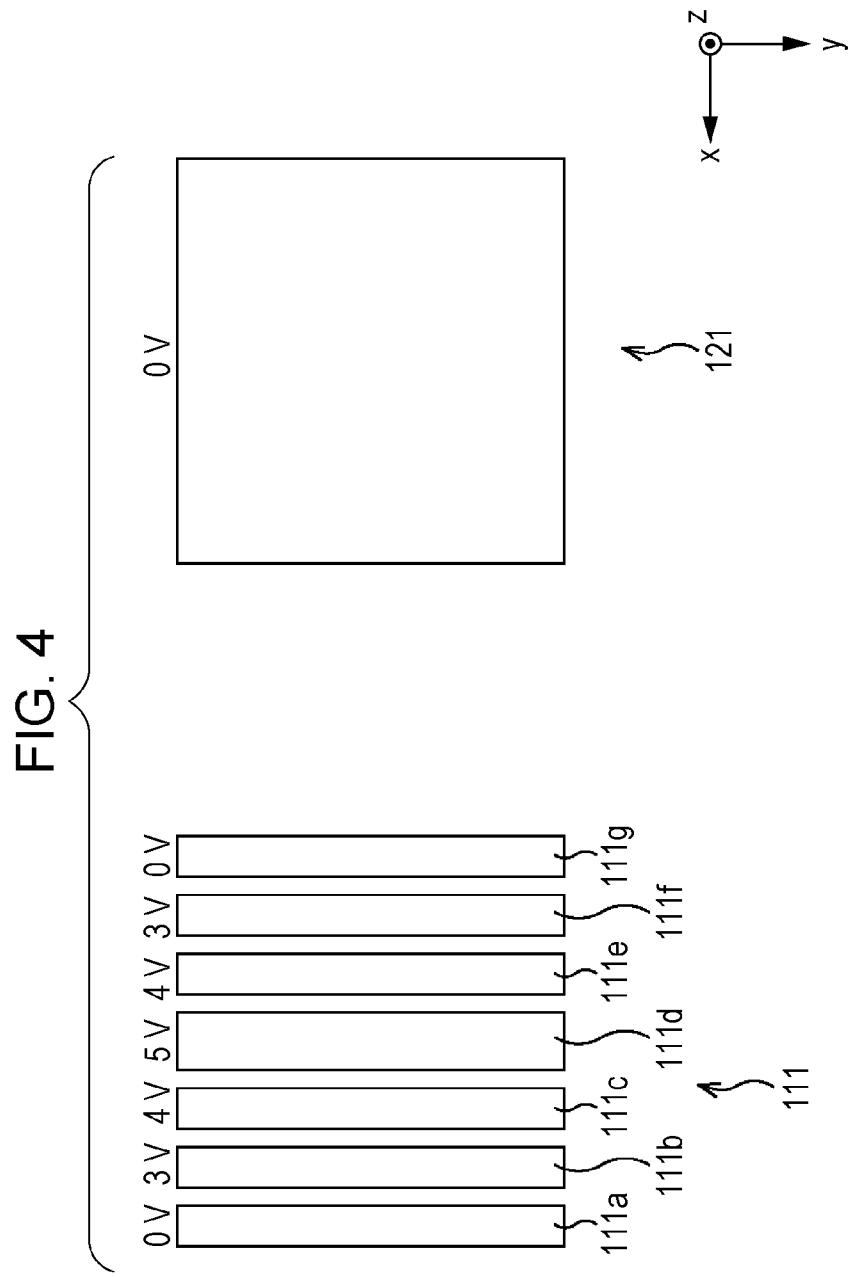
FIG. 4 is a diagram illustrating the structures of electrodes in the liquid crystal lens.

A first electrode 111 in which a plurality of transparent electrodes 111a to 111g extending in the y direction and made of a transparent conductive material such as ITO are arranged in the width direction (x direction) with intervals therebetween as shown in the left part of FIG. 4 is formed on the first substrate 81 so as to be opposed to the second substrate 82. In addition, an alignment film 112 is formed on the first substrate 81 with the first electrode 111 interposed therebetween.

A flat plate-shaped second electrode 121 made of a transparent conductive material such as ITO is formed as shown in the right part of FIG. 4 on the second substrate 82 so as to be opposed to the first substrate 81. In addition, an alignment film 122 is formed on the second substrate 82 with the second electrode 121 interposed therebetween.

The liquid crystal layer 83 includes liquid crystal molecules 131, and the lens effect is controlled by changing the arrangement direction of the liquid crystal molecules 131 in accordance with a voltage which is applied to the first electrode 111 and the second electrode 121. The liquid crystal molecules 131 have refractive-index anisotropy, and have, for example, a refractive index ellipsoid structure in which the refractive index of a transmitted light ray varies in the longitudinal direction and in the transverse direction.

In this embodiment, the alignment film 112 and the alignment film 122 are vertical alignment films, and the liquid crystal molecules 131 constitute a nematic liquid crystal (hereinafter, referred to as the n-type nematic liquid crystal) having negative dielectric anisotropy.

Although organic materials are generally used as the material for the vertical alignment film, inorganic materials may be used. In addition, the n-type nematic liquid crystal has characteristics in that the dielectric constant is higher in the short axis of the liquid crystal molecules than in the long axis, the long axis lies horizontally with increasing applied voltage, and thus the liquid crystal molecules are aligned horizontally to the substrate.

That is, in the liquid crystal layer 83, in a state in which no voltage is applied to the first electrode 111 and the second electrode 121, the liquid crystal molecules 131 are aligned perpendicular to the first substrate 81 and the second substrate 82.

In addition, in the liquid crystal layer 83, when a voltage is applied to the first electrode 111 and the second electrode 121, a lens effect occurs which has a cylindrical lens shape extending in the y direction. At this time, in the plurality of transparent electrodes 111a to 111g of the first electrode 111, the highest voltage is applied to a transparent electrode positioned at the center in the width direction, and the applied voltage is lower the further a transparent electrode is positioned toward the outer side in the width direction.

Specifically, as shown in FIG. 4, a voltage of 5 V is applied to the transparent electrode 111d positioned at the center, a voltage of 4 V is applied to the transparent electrodes 111c and 111e, a voltage of 3 V is applied to the transparent electrodes 111b and 111f, and a voltage of 0 V is applied to the transparent electrodes 111a and 111g in the transparent electrodes 111a to 111g. In addition, a voltage of 0 V is applied to the second electrode 121 opposed to the first electrode 111.

In the liquid crystal lens 33, the first electrode 111 and the second electrode 121 shown in FIG. 4 are disposed in a matrix manner to correspond to each of the pixels of the optical modulation panel 32. Accordingly, the liquid crystal layer 83 has the same lens effect as a lenticular lens formed of a plurality of cylindrical lenses.

According to the above configuration, a 3D image can be displayed by using the liquid crystal lens as a lenticular lens. In addition, in the liquid crystal layer, liquid crystal molecules are aligned perpendicular to the substrate in a state in which no voltage is applied to the first electrode and the second electrode, and thus in the manufacturing process, the rubbing process for the alignment film can be eliminated, and productivity can be improved. In addition, since it is not to perform the rubbing process, there is no variation in the pre-tilt angle of the liquid crystal molecules, and the optical characteristics of the liquid crystal lens can be stabilized.

2. Second Embodiment

Next, another structure of the liquid crystal lens 33 will be described with reference to FIG. 5. In the liquid crystal lens 33 of FIG. 5, parts corresponding to the parts in the liquid crystal lens 33 of FIG. 3 will be denoted by the same reference symbols, and descriptions thereof will be appropriately omitted.

Figure 5:
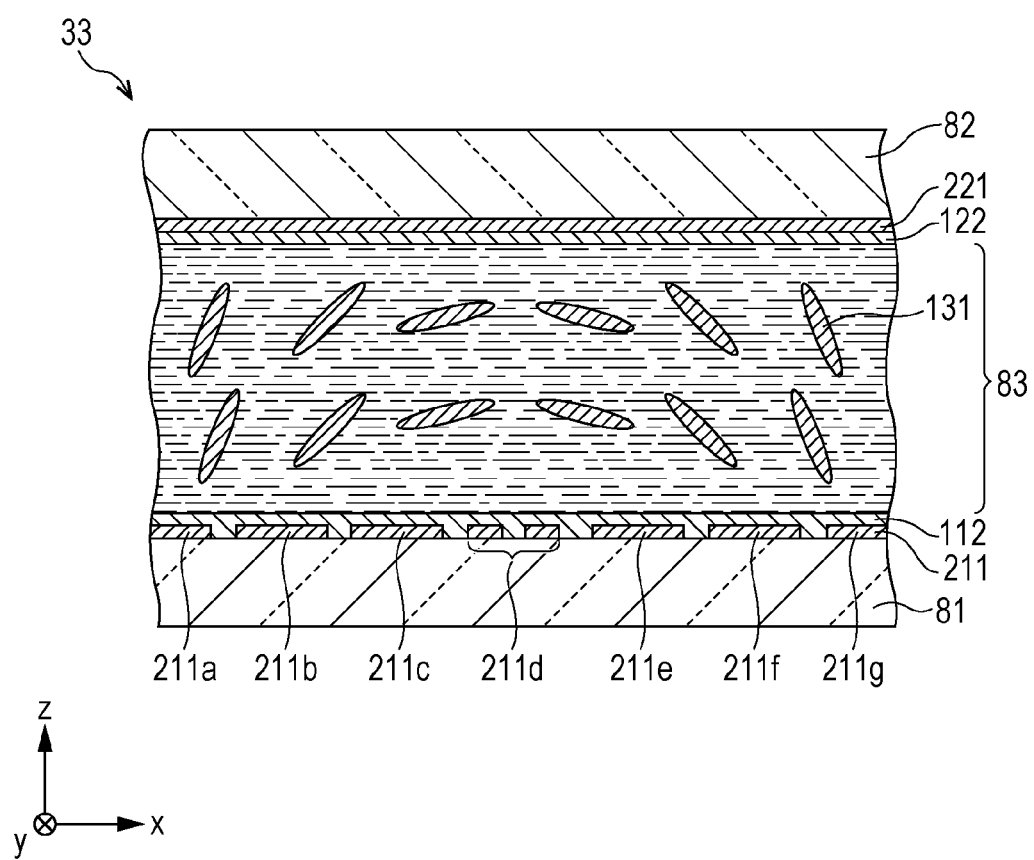
FIG. 5 is a cross-sectional view illustrating the structure of a liquid crystal lens.

That is, the liquid crystal lens 33 of FIG. 5 is different from the liquid crystal lens 33 of FIG. 3 in that a first electrode 211 is provided in place of the first electrode 111 and a second electrode 221 is provided in place of the second electrode 121.

Figure 6:
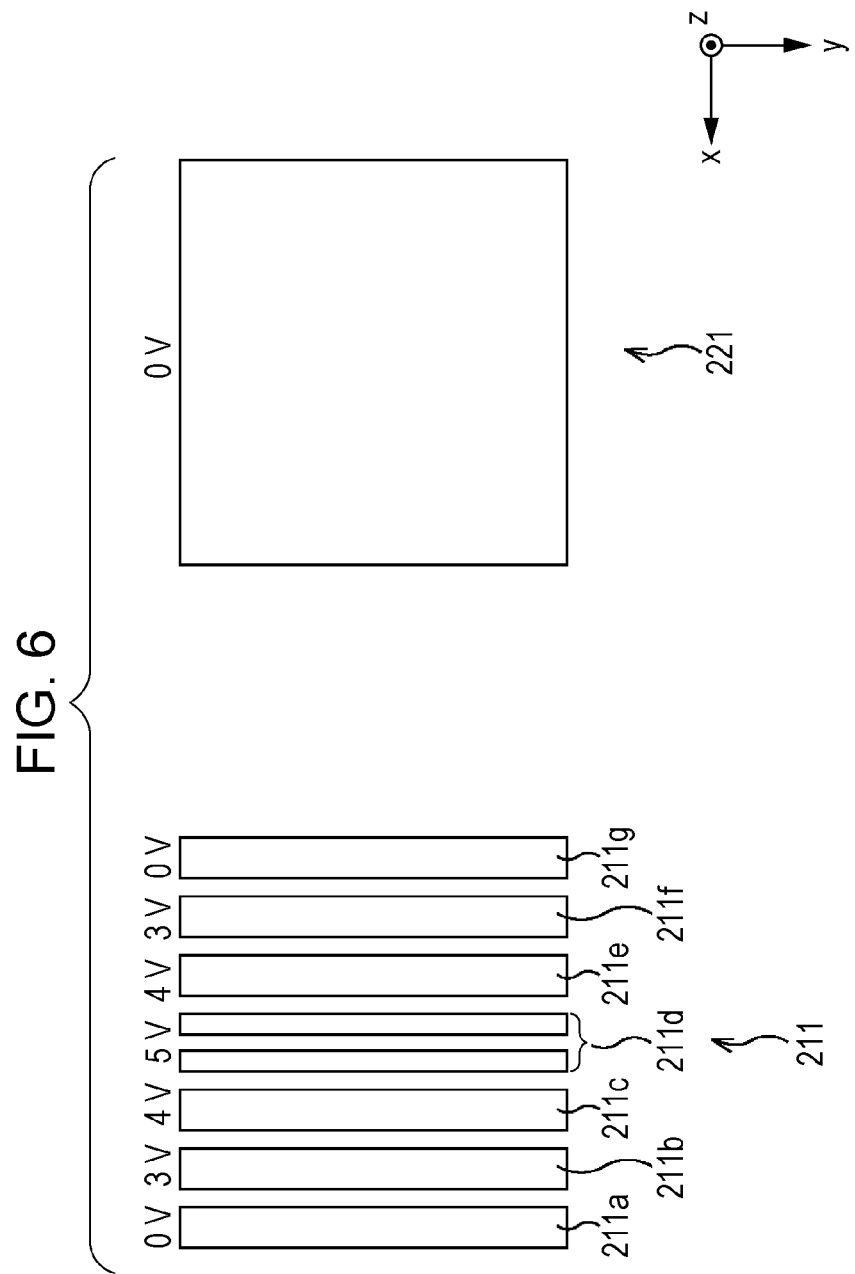
FIG. 6 is a diagram illustrating the structures of electrodes in the liquid crystal lens.

As in the liquid crystal lens 33 of FIG. 3, in the liquid crystal lens 33 of FIG. 5, the first electrode 211 in which a plurality of transparent electrodes 211a to 211g extending in the y direction are arranged in the width direction (x direction) with intervals therebetween as shown in the left part of FIG. 6 is formed on the first substrate 81 so as to be opposed to the second substrate 82. Among the transparent electrodes 211a to 211g, the transparent electrode 211d positioned at the center is provided with a slit extending in the y direction.

In addition, the flat plate-shaped second electrode 221 is formed as shown in the right part of FIG. 6 on the second substrate 82 so as to be opposed to the first substrate 81.

Also in the liquid crystal lens 33 of this embodiment, as shown in FIG. 6, a voltage of 5 V is applied to the transparent electrode 211d positioned at the center, a voltage of 4 V is applied to the transparent electrodes 211c and 211e, a voltage of 3 V is applied to the transparent electrodes 211b and 211f, and a voltage of 0 V is applied to the transparent electrodes 211a and 211g in the transparent electrodes 211a to 211g. In addition, a voltage of 0 V is applied to the second electrode 221 opposed to the first electrode 211.

According to the above configuration, the same action and effect can be achieved as the liquid crystal lens described with reference to FIG. 3. In addition, among the plurality of transparent electrodes of the first electrode, a transparent electrode positioned at the center is provided with a slit extending in the y direction, and thus the alignment of the liquid crystal molecules in the vicinity of the transparent electrode positioned at the center is uniformized and the image quality of a 3D image can be improved.

3. Third Embodiment

Next, yet another structure of the liquid crystal lens 33 will be described with reference to FIG. 7. In the liquid crystal lens 33 of FIG. 7, parts corresponding to the parts in the liquid crystal lens 33 of FIG. 3 will be denoted by the same reference symbols, and descriptions thereof will be appropriately omitted.

Figure 7:
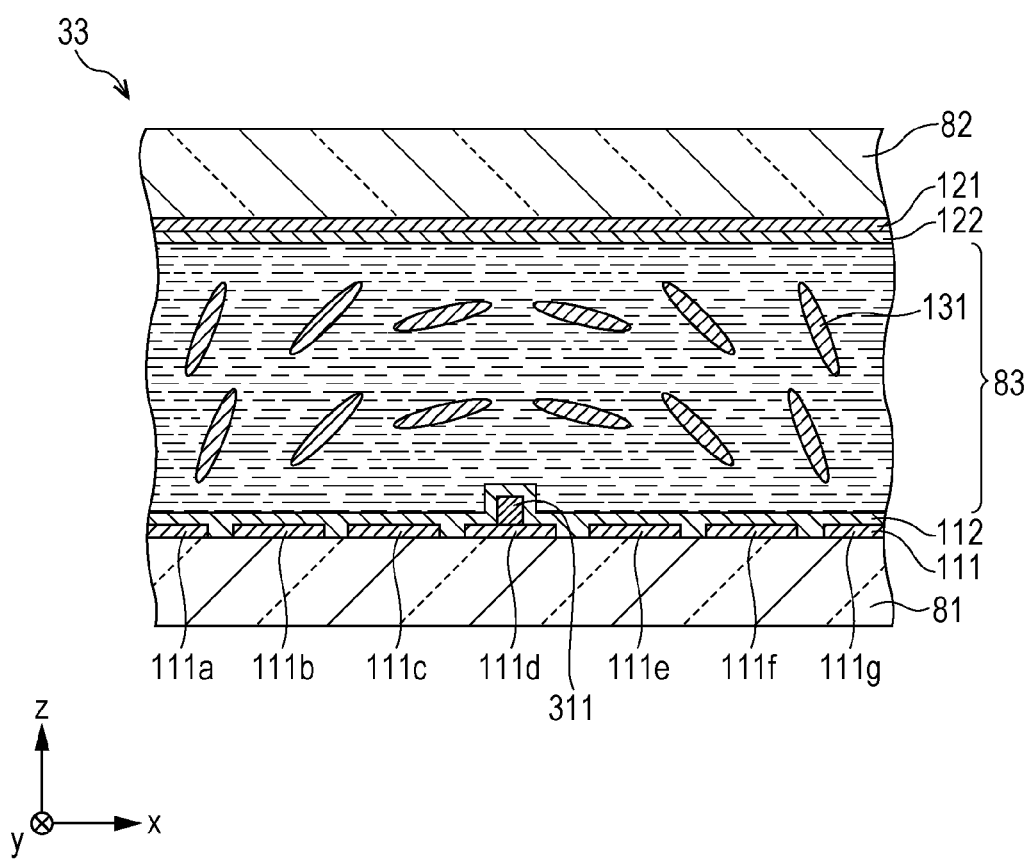
FIG. 7 is a cross-sectional view illustrating the structure of a liquid crystal lens.

That is, the liquid crystal lens 33 of FIG. 7 is different from the liquid crystal lens 33 of FIG. 3 in that a protrusion 311 made of a transparent conductive material such as ITO is provided on the first electrode 111 and under the alignment film 112.

Figure 8:
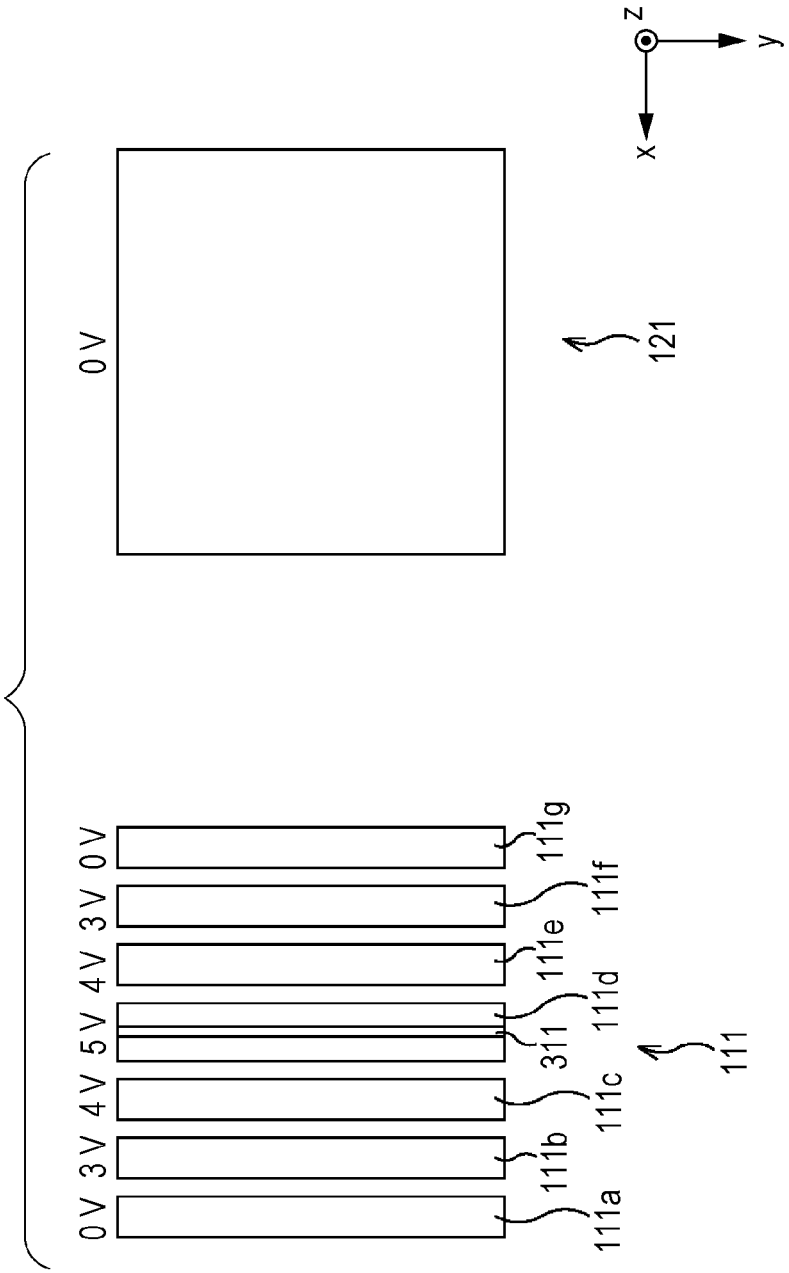
FIG. 8 is a diagram illustrating the structures of electrodes in the liquid crystal lens.

As shown in the left part of FIG. 8, the protrusion 311 is provided to extend in the y direction on the transparent electrode 111d positioned at the center, among the transparent electrodes 111a to 111g of the first electrode 111. Although the protrusion 311 is made of a transparent conductive material such as ITO as in the case of the transparent electrode 111d, it may also be made of an organic material (resin) as in the case of the alignment film 112.

According to the above configuration, the same action and effect can be achieved as the liquid crystal lens described with reference to FIG. 3. In addition, among the plurality of transparent electrodes of the first electrode, a transparent electrode positioned at the center is provided with a protrusion extending in the y direction, and thus the alignment of the liquid crystal molecules in the vicinity of the transparent electrode positioned at the center is uniformized and the image quality of a 3D image can be improved.

In the above description, the liquid crystal lens which generates the same lens effect as a lenticular lens formed of a plurality of cylindrical lenses extending in one direction has been described. However, in the above-described liquid crystal lens configuration, for example, a 3D image can be displayed at all times when the display is performed in a horizontally longer state in a display device having a horizontally longer screen, but in a display device in which the display state can be switched between the horizontally longer state and the vertically longer state, for example, a 3D image is not displayed when the display is performed in a vertically longer state.

Hereinafter, a configuration for the case in which the present disclosure is applied to a display device in which the display state can be switched between a horizontally longer state and a vertically longer state will be described.

4. Fourth Embodiment

Figure 9:
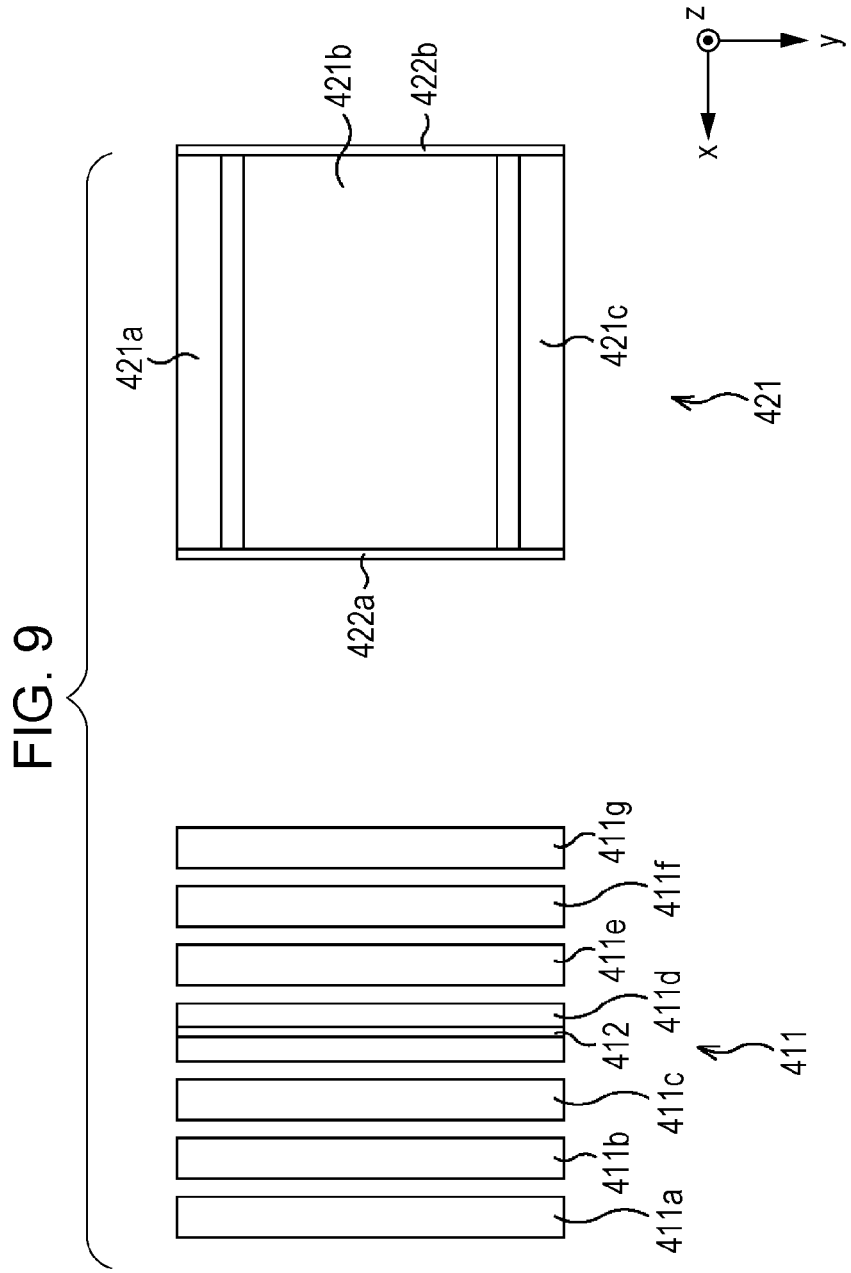
FIG. 9 is a diagram illustrating the structures of electrodes in the liquid crystal lens.

FIG. 9 shows structures of a first electrode 411 and a second electrode 421 as replacements for the first electrode 111 and the second electrode 121 in the liquid crystal lens 33 of FIG. 3.

The first electrode 411 has a configuration in which a plurality of transparent electrodes 411a to 411g extending in the y direction and made of a transparent conductive material such as ITO are arranged with intervals therebetween in the width direction (x direction). In addition, a protrusion 421 is provided to extend in the y direction on the transparent electrode 411d positioned at the center among the transparent electrodes 411a to 411g of the first electrode 411. The protrusion 421 may be made of a transparent conductive material such as ITO as in the case of the transparent electrode 411d, and may also be made of an organic material as in the case of the alignment film 112.

The second electrode 421 has a configuration in which a plurality of transparent electrodes 421a to 421c extending in the x direction and made of a transparent conductive material such as ITO are arranged with intervals therebetween in the width direction (y direction). The transparent electrode 421b is formed to be wider in the width direction than the transparent electrodes 421a and 421c. In addition, protrusions 422a and 422b are provided to extend in the y direction at both ends of the transparent electrodes 421a to 421c of the second electrode 421 in the extending direction. The protrusions 422a and 422b may be made of a transparent conductive material such as ITO as in the case of the transparent electrodes 421a to 421c, and may also be made of an organic material as in the case of the alignment film 122.

Here, when the display section 21 has a display surface which is horizontally longer in the x direction, it is necessary for the liquid crystal lens 33 to generate the same lens effect as a lenticular lens formed of a plurality of cylindrical lenses extending in the y direction when the display state is a horizontally longer state. In addition, when the display state is a vertically longer state, it is necessary for the liquid crystal lens 33 to generate the same lens effect as a lenticular lens formed of a plurality of cylindrical lenses extending in the x direction.

Figure 10:
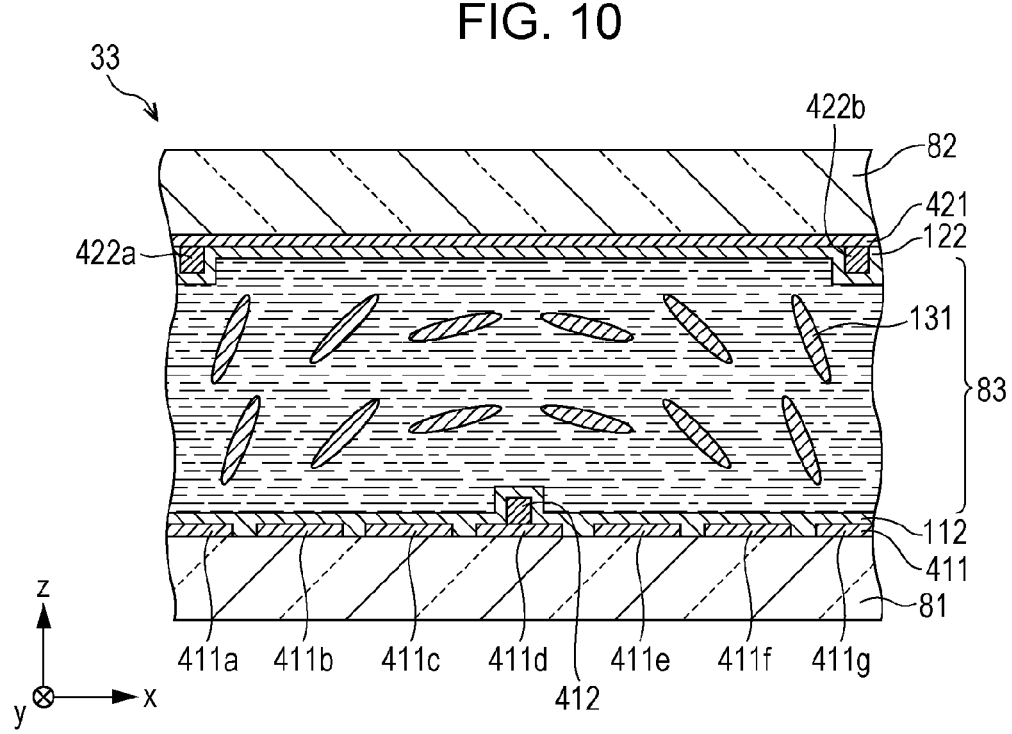
FIG. 10 is a cross-sectional view illustrating the structure of a liquid crystal lens.

FIG. 10 shows a cross-sectional view of the liquid crystal lens 33 for the case in which the display state of the display section 21 is a horizontally longer state. In the liquid crystal lens 33 of FIG. 10, parts corresponding to the parts in the liquid crystal lens 33 of FIG. 3 will be denoted by the same reference symbols, and descriptions thereof will be appropriately omitted. In addition, in FIG. 10, the transverse direction, the depth direction, and the longitudinal direction are set as an x direction, a y direction, and a z direction, respectively.

In this case, by virtue of the liquid crystal lens driving section 23, a voltage of 5 V is applied to the transparent electrode 411d positioned at the center among the transparent electrodes 411a to 411g, a voltage of 4 V is applied to the transparent electrodes 411c and 411e, a voltage of 3 V is applied to the transparent electrodes 411b and 411f, and a voltage of 0 V is applied to the transparent electrodes 411a and 411g. In addition, a voltage of 0 V is applied to the second electrode 421 opposed to the first electrode 411.

Accordingly, in the liquid crystal layer 83, the same lens effect as a lenticular lens formed of a plurality of cylindrical lenses extending in the y direction can be generated. In FIG. 10, the transmission axis of the liquid crystal layer 83 is in the transverse direction (x direction).

Figure 11:
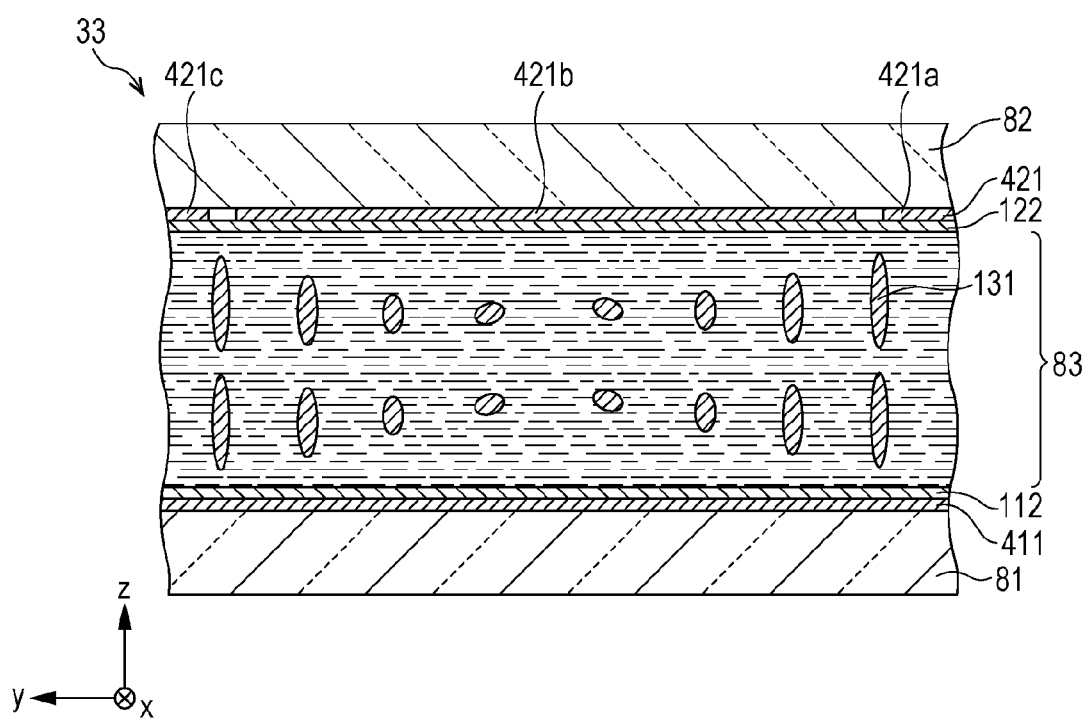
FIG. 11 is a cross-sectional view illustrating the structure of a liquid crystal lens.

FIG. 11 shows a cross-sectional view of the liquid crystal lens 33 for the case in which the display state of the display section 21 is a vertically longer state. In the liquid crystal lens 33 of FIG. 11, parts corresponding to the parts in the liquid crystal lens 33 of FIG. 3 will be denoted by the same reference symbols, and descriptions thereof will be appropriately omitted. In addition, in FIG. 11, the transverse direction, the depth direction, and the longitudinal direction are set as a y direction, an x direction, and a z direction, respectively.

In this case, by virtue of the liquid crystal lens driving section 23, a voltage of 0 V is applied to the transparent electrodes 411a to 411g of the first electrode 411. In addition, a voltage of 5 V is applied to the transparent electrode 421b positioned at the center among the transparent electrodes 421a to 421c of the second electrode 421, and a voltage of 0 V is applied to the transparent electrodes 421a and 421c.

Accordingly, the liquid crystal layer 83 has the same lens effect as a lenticular lens formed of a plurality of cylindrical lenses extending in the x direction. In FIG. 11, the transmission axis of the liquid crystal layer 83 is in the depth direction (x direction).

According to the above configuration, the same action and effect can be achieved as the liquid crystal lens described with reference to FIGS. 3 to 9. In addition, it is possible to generate the same lens effect as a lenticular lens according to the display state while maintaining the polarization direction of the liquid crystal layer 83.

5. Examples of Application to Electronic Apparatus

Next, examples of the application of the 3D image display device described in the above-described embodiments will be described with reference to FIGS. 12 to 15 and 16A to 16G. The 3D image display device according to the above-described embodiments can be applied to electronic apparatuses of any field such as TV devices, digital cameras, note-type personal computers, portable terminal devices such as cell phones, and video cameras. In other words, the 3D image display device according to the above-described embodiments can be applied to all fields of electronic apparatuses which display an image signal input from the outside or an image signal generated internally as an image.

APPLICATION EXAMPLE 1

Figure 12:
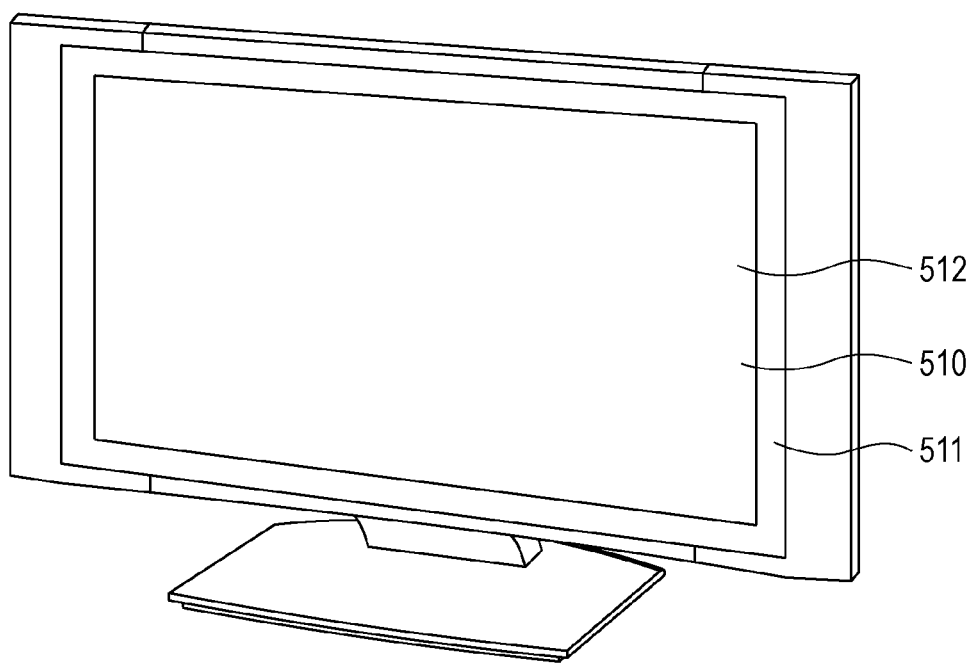
FIG. 12 is a diagram illustrating an example of the application to an electronic apparatus of the present disclosure.

FIG. 12 shows the appearance of a TV device to which the 3D image display device according to the above-described embodiments is applied. The TV device has, for example, a video display screen section 510 including a front panel 511 and a filter glass 512, and the video display screen section 510 is constituted of the display section of the 3D image display device according to the above-described embodiments.

APPLICATION EXAMPLE 2

Figure 13A:
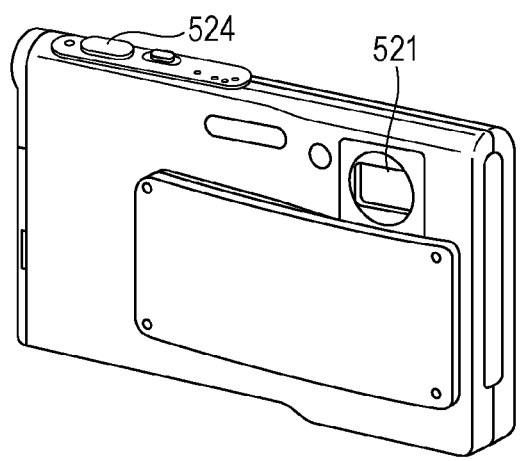
FIG. 13A and 13B are diagrams illustrating an example of the application to an electronic apparatus of the present disclosure.
Figure 13B:
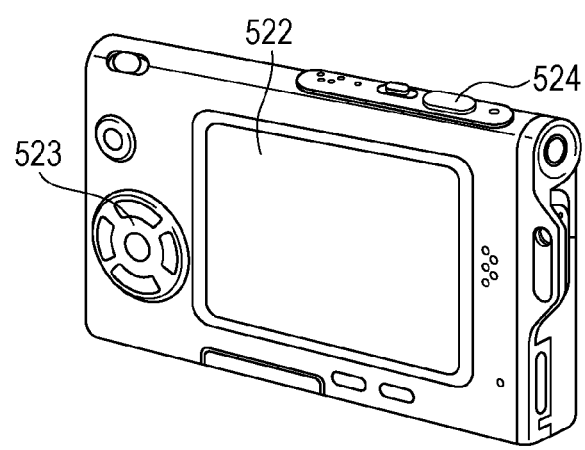

FIG. 13A and 13B show the appearance of a digital camera to which the 3D image display device according to the above-described embodiments is applied. The digital camera has, for example, a light-emitting section 521 for a flash, a display section 522, a menu switch 523, and a shutter button 524, and the display section 522 is constituted of the display section of the 3D image display device according to the above-described embodiments.

APPLICATION EXAMPLE 3

Figure 14:
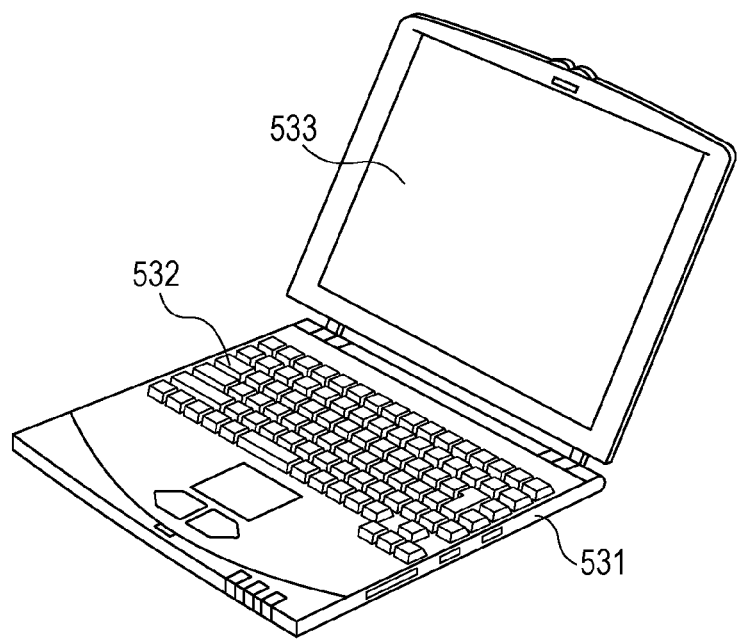
FIG. 14 is a diagram illustrating an example of the application to an electronic apparatus of the present disclosure.

FIG. 14 shows the appearance of a note-type personal computer to which the 3D image display device according to the above-described embodiments is applied. The note-type personal computer has, for example, a main body 531, a keyboard 532 for inputting letters and the like, and a display section 533 which displays an image, and the display section 533 is constituted of the display section of the 3D image display device according to the above-described embodiments.

APPLICATION EXAMPLE 4

Figure 15:
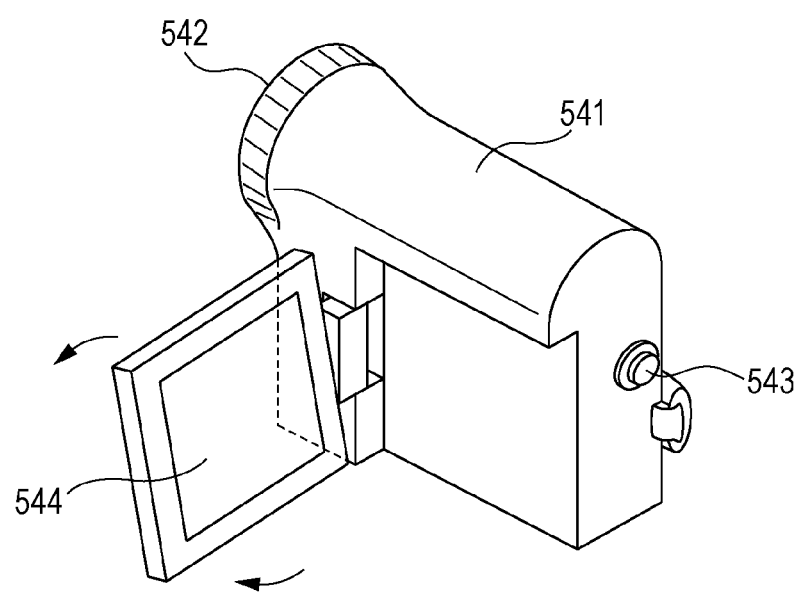
FIG. 15 is a diagram illustrating an example of the application to an electronic apparatus of the present disclosure.

FIG. 15 shows the appearance of a video camera to which the 3D image display device according to the above-described embodiments is applied. The video camera has, for example, a main body section 541, a lens 542 for photographing an object which is provided on the front side surface of the main body section 541, a start/stop switch 543 used when filming, and a display section 544, and the display section 544 is constituted of the display section of the 3D image display device according to the above-described embodiments.

APPLICATION EXAMPLE 5

FIGS. 16A to 16G show the appearance of a cell phone to which the 3D image display device according to the above-described embodiments is applied. The cell phone has, for example, a configuration in which a connecting section (hinge section) 730 connects an upper housing 710 to a lower housing 720, and has a display 740, a sub-display 750, a picture light 760, and a camera 770. The display 740 or the sub-display 750 is constituted of the display section of the 3D image display device according to the above-described embodiments.

In the above description, the 3D image display device according to the above-described embodiments provides a 3D image to an observer by displaying images for two points of view. However, the present disclosure is not limited to the 3D image, and a plurality of images differing according to the point of view, that is, images for multiple points of view may be provided. Specifically, for example, the present disclosure may be applied to a car navigation system in which differing images are viewed from the driver's seat and from the passenger's seat of a car.

In addition, the embodiments of the present disclosure are not limited to the above-described embodiments, and various modifications can be made without departing from the gist of the present disclosure.

Furthermore, the present disclosure can employ the following configuration.

(1) A liquid crystal display device including a liquid crystal panel which displays a left eye image and a right eye image; and an optical device which generates a lens effect of a lens group which causes binocular parallax, in which the optical device includes a first substrate and a second substrate which are disposed opposed to each other with an interval therebetween, a first electrode which is formed on the first substrate so as to be opposed to the second substrate and has a plurality of transparent electrodes extending in a predetermined direction and arranged with intervals therebetween in a width direction, a second electrode which is formed on the second substrate so as to be opposed to the first substrate, and a liquid crystal layer which is disposed between the first substrate and the second substrate and includes liquid crystal molecules, the alignment direction of which is changed in accordance with a voltage which is applied to the first electrode and the second electrode, and in the liquid crystal layer, the liquid crystal molecules are aligned vertically in a state in which no voltage is applied to the first electrode and the second electrode.

(2) The liquid crystal display device according to (1), in which in the plurality of transparent electrodes corresponding to one lens of the lens group, the transparent electrode positioned at the center in the width direction is provided with a slit or a protrusion in the predetermined direction.

(3) The liquid crystal display device according to (2), in which in the plurality of transparent electrodes corresponding to one lens, the highest voltage is applied to the transparent electrode positioned at the center in the width direction, and the applied voltage is lower the further the transparent electrode is positioned toward the outer side in the width direction.

(4) The liquid crystal display device according to any one of (1) to (3), in which the second electrode has a plurality of transparent electrodes extending in a direction perpendicular to the predetermined direction and arranged with intervals therebetween in a width direction, and the voltage which is applied to the first electrode and the second electrode is switched in accordance with a display state of the image displayed on the liquid crystal panel.

(5) The liquid crystal display device according to (1) to (4), in which the liquid crystal molecules constitute a nematic liquid crystal having negative dielectric anisotropy.

(6) An electronic apparatus including a liquid crystal display device which performs display on the basis of an image signal; and a processor which generates the image signal through a predetermined process, in which the liquid crystal display device includes a liquid crystal panel which displays a left eye image and a right eye image, and an optical device which generates a lens effect of a lens group which causes binocular parallax, the optical device includes a first substrate and a second substrate which are disposed opposed to each other with an interval therebetween, a first electrode which is formed on the first substrate so as to be opposed to the second substrate and has a plurality of transparent electrodes extending in a predetermined direction and arranged with intervals therebetween in a width direction, a second electrode which is formed on the second substrate so as to be opposed to the first substrate, and a liquid crystal layer which is disposed between the first substrate and the second substrate and includes liquid crystal molecules, the alignment direction of which is changed in accordance with a voltage which is applied to the first electrode and the second electrode, and in the liquid crystal layer, the liquid crystal molecules are aligned vertically in a state in which no voltage is applied to the first electrode and the second electrode.

(7) An optical device including a first substrate and a second substrate which are disposed opposed to each other with an interval therebetween; a first electrode which is formed on the first substrate so as to be opposed to the second substrate and has a plurality of transparent electrodes extending in a predetermined direction and arranged with intervals therebetween in a width direction; a second electrode which is formed on the second substrate so as to be opposed to the first substrate; and a liquid crystal layer which is disposed between the first substrate and the second substrate and includes liquid crystal molecules, the alignment direction of which is changed in accordance with a voltage which is applied to the first electrode and the second electrode, in which in the liquid crystal layer, the liquid crystal molecules are aligned vertically in a state in which no voltage is applied to the first electrode and the second electrode.

The present disclosure contains subject matter related to that disclosed in Japanese Priority Patent Application JP 2011-271943 filed in the Japan Patent Office on Dec. 13, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device, comprising:
a liquid crystal panel which displays a left eye image and a right eye image; and
an optical device which generates a lens effect of a lens group which causes binocular parallax,
the optical device, including:
  a first substrate and a second substrate which are disposed opposed to each other with an interval therebetween,
  a first electrode which is formed on the first substrate so as to be opposed to the second substrate and has a plurality of transparent electrodes extending in a predetermined direction and arranged with intervals therebetween in a width direction,
  a second electrode which is formed on the second substrate so as to be opposed to the first substrate, and
  a liquid crystal layer which is disposed between the first substrate and the second substrate and includes liquid crystal molecules, the alignment direction of which is changed in accordance with a voltage which is applied to the first electrode and the second electrode,
wherein in the liquid crystal layer, the liquid crystal molecules are aligned vertically in a state in which no voltage is applied to the first electrode and the second electrode,
wherein in the plurality of transparent electrodes corresponding to one lens of the lens group, the transparent electrode positioned at the center in the width direction is provided with a center-electrode structure in the predetermined direction, wherein the center-electrode structure is a slit, and wherein in the liquid crystal layer, in an area adjacent to the slit, the liquid crystal molecules are aligned substantially horizontally to the first and second substrates when the voltage is applied to the first electrode and the second electrode.

2. The liquid crystal display device according to claim 1, wherein in the plurality of transparent electrodes corresponding to one lens, the highest voltage is applied to the transparent electrode positioned at the center in the width direction, and the applied voltage is lower the further the transparent electrode is positioned toward the outer side in the width direction.

3. The liquid crystal display device according to claim 1, wherein the second electrode has a plurality of transparent electrodes extending in a direction perpendicular to the predetermined direction and arranged with intervals therebetween in a width direction, and the voltage which is applied to the first electrode and the second electrode is switched in accordance with a display state of the image displayed on the liquid crystal panel.

4. The liquid crystal display device according to claim 1, wherein the liquid crystal molecules constitute a nematic liquid crystal having negative dielectric anisotropy.

5. An optical device comprising:
a first substrate and a second substrate which are disposed opposed to each other with an interval therebetween;
a first electrode which is formed on the first substrate so as to be opposed to the second substrate and has a plurality of transparent electrodes extending in a predetermined direction and arranged with intervals therebetween in a width direction;
a second electrode which is formed on the second substrate so as to be opposed to the first substrate; and
a liquid crystal layer which is disposed between the first substrate and the second substrate and includes liquid crystal molecules, the alignment direction of which is changed in accordance with a voltage which is applied to the first electrode and the second electrode,
wherein in the liquid crystal layer, the liquid crystal molecules are aligned vertically in a state in which no voltage is applied to the first electrode and the second electrode,
wherein in the plurality of transparent electrodes corresponding to one lens of the lens group, the transparent electrode positioned at the center in the width direction is provided with a center-electrode structure in the predetermined direction,
wherein the center-electrode structure is a slit, and
wherein in the liquid crystal layer, in an area adjacent to the slit, the liquid crystal molecules are aligned substantially horizontally to the first and second substrates when the voltage is applied to the first electrode and the second electrode.

6. The optical device according to claim 5, wherein in the plurality of transparent electrodes corresponding to one lens, the highest voltage is applied to the transparent electrode positioned at the center in the width direction, and the applied voltage is lower the further the transparent electrode is positioned toward the outer side in the width direction.

7. The optical device according to claim 5, wherein the second electrode has a plurality of transparent electrodes extending in a direction perpendicular to the predetermined direction and arranged with intervals therebetween in a width direction.

8. The optical device according to claim 5, wherein the liquid crystal molecules constitute a nematic liquid crystal having negative dielectric anisotropy.

9. A liquid crystal display device, comprising:
a liquid crystal panel which displays a left eye image and a right eye image; and an optical device which generates a lens effect of a lens group which causes binocular parallax,
the optical device, including:
a first substrate and a second substrate which are disposed opposed to each other with an interval therebetween,
a first electrode which is formed on the first substrate so as to be opposed to the second substrate and has a plurality of transparent electrodes extending in a predetermined direction and arranged with intervals therebetween in a width direction,
a second electrode which is formed on the second substrate so as to be opposed to the first substrate, and
a liquid crystal layer which is disposed between the first substrate and the second substrate and includes liquid crystal molecules, the alignment direction of which is changed in accordance with a voltage which is applied to the first electrode and the second electrode,
wherein in the liquid crystal layer, the liquid crystal molecules are aligned vertically in a state in which no voltage is applied to the first electrode and the second electrode,
wherein in the plurality of transparent electrodes corresponding to one lens of the lens group, the transparent electrode positioned at the center in the width direction is provided with a protrusion center-electrode structure in the predetermined direction,
wherein the center-electrode structure is a slit or a protrusion,
wherein in the liquid crystal layer, in an area adjacent to the center-electrode structure, the liquid crystal molecules are aligned substantially horizontally to the first and second substrates when the voltage is applied to the first electrode and the second electrode,
wherein the second electrode has a plurality of transparent electrodes extending in a direction perpendicular to the predetermined direction and arranged with intervals therebetween in a width direction, wherein the voltage which is applied to the first electrode and the second electrode is switched in accordance with a display state of the image displayed on the liquid crystal panel, and wherein second protrusions are provided extending in the predetermined direction at both ends of the plurality of transparent electrodes of the second electrode in the width direction.

10. The liquid crystal display device according to claim 9, wherein in the plurality of transparent electrodes corresponding to one lens, the highest voltage is applied to the transparent electrode positioned at the center in the width direction, and the applied voltage is lower the further the transparent electrode is positioned toward the outer side in the width direction.

11. The liquid crystal display device according to claim 9, wherein the liquid crystal molecules constitute a nematic liquid crystal having negative dielectric anisotropy.

12. An optical device comprising:
a first substrate and a second substrate which are disposed opposed to each other with an interval therebetween;
a first electrode which is formed on the first substrate so as to be opposed to the second substrate and has a plurality of transparent electrodes extending in a predetermined direction and arranged with intervals therebetween in a width direction;
a second electrode which is formed on the second substrate so as to be opposed to the first substrate; and
a liquid crystal layer which is disposed between the first substrate and the second substrate and includes liquid crystal molecules, the alignment direction of which is changed in accordance with a voltage which is applied to the first electrode and the second electrode,
wherein in the liquid crystal layer, the liquid crystal molecules are aligned vertically in a state in which no voltage is applied to the first electrode and the second electrode,
wherein in the plurality of transparent electrodes corresponding to one lens of the lens group, the transparent electrode positioned at the center in the width direction is provided with a center-electrode structure in the predetermined direction,
wherein the center-electrode structure is a slit or a protrusion,
wherein in the liquid crystal layer, in an area adjacent to the center-electrode structure, the liquid crystal molecules are aligned substantially horizontally to the first and second substrates when the voltage is applied to the first electrode and the second electrode,
wherein the second electrode has a plurality of transparent electrodes extending in a direction perpendicular to the predetermined direction and arranged with intervals therebetween in a width direction, and
wherein second protrusions are provided extending in the predetermined direction at both ends of the plurality of transparent electrodes of the second electrode in the width direction.

13. The optical device according to claim 12,
wherein in the plurality of transparent electrodes corresponding to one lens, the highest voltage is applied to the transparent electrode positioned at the center in the width direction, and the applied voltage is lower the further the transparent electrode is positioned toward the outer side in the width direction.

14. The optical device according to claim 12,
wherein the liquid crystal molecules constitute a nematic liquid crystal having negative dielectric anisotropy.

* * * * *

UNITED STATES PATENT AND TRADEMARK OFFICE
CERTIFICATE OF CORRECTION

| | | |
|---|---|---|
| PATENT NO. | : 9,025,093 B2 | Page 1 of 1 |
| APPLICATION NO. | : 13/682853 | |
| DATED | : May 5, 2015 | |
| INVENTOR(S) | : Tsuyoshi Ohyama | |

It is certified that error appears in the above-identified patent and that said Letters Patent is hereby corrected as shown below:

On the title page col. 2,
Item (56), U.S. Patent Documents, line 3,

Patent No. 1,017,590 should be replaced with Publication No.:
--2011/0175906   A1   07/2011   Zheng et al.--

Signed and Sealed this
Fifteenth Day of December, 2015

Michelle K. Lee
*Director of the United States Patent and Trademark Office*